United States Patent [19]
Gaydos, Jr.

[11] 3,815,574
[45] June 11, 1974

[54] SOLAR HEATING SYSTEM
[76] Inventor: George Roy Gaydos, Jr., Rt. 1 P.O. Box 319A, Brandywine, Md. 20613
[22] Filed: June 1, 1973
[21] Appl. No.: 366,148

[52] U.S. Cl. .............................................. 126/271
[51] Int. Cl. ............................................... F24j 3/02
[58] Field of Search ........................... 126/270, 271

[56] References Cited
UNITED STATES PATENTS

| | | | |
|---|---|---|---|
| 1,673,429 | 6/1928 | Vinson | 126/271 |
| 2,277,311 | 3/1942 | Freeman | 126/271 |
| 2,311,579 | 2/1943 | Scott | 237/1 A |
| 3,145,707 | 8/1964 | Thomason | 126/271 |
| 3,194,228 | 7/1965 | Bargues | 126/271 |
| 3,369,539 | 2/1968 | Thomason | 126/271 |

Primary Examiner—William F. O'Dea
Assistant Examiner—Peter D. Ferguson
Attorney, Agent, or Firm—Roylance, Abrams, Berdo & Kaul

[57] ABSTRACT

A heating system includes a fluid circuit with a pump and filter for heating water for a pool. A valved bypass circuit includes a heat absorption unit which can be included in the circuit when desired. The heat absorption unit includes a relatively shallow container of thermally nonconductive material such as wood, the interior of which is lined with a layer of foamed polystyrene. The receptacle thus formed is lined on its interior with builder's foil and contains a relatively thick layer of sand in which is buried a continuous array of pipe either in sinuous configuration or, alternatively, a plurality of parallel pipe lengths extending between headers. In either configuration an inlet and outlet connection is provided so that the pump can circulate water through all of the pipe in the absorption unit. The upper exposed surface of the sand in the unit, at least, is covered with a layer of iron oxide. Alternatively, the sand can be omitted and iron oxide can be employed to fill the entire box. Finally, a layer of crystal glass closes the upper surface of the box which is then mounted so as to receive solar radiation.

4 Claims, 5 Drawing Figures

SOLAR HEATING SYSTEM

This invention relates to an apparatus for efficiently elevating the temperature of water using solar energy.

Man has long recognized that the energy of the Sun represented a vast source of power which, while utilized by many natural processes, has not been effectively harnessed by man for performing mechanical tasks on the surface of the earth. Although several efforts to elevate the temperature of water for evaporation or other purposes have been proposed, none have achieved significant or wide acceptance, possibly because of the relatively low efficiency in the absorption process and the minimal change in water temperature obtainable.

It is an object of the present invention to provide an apparatus capable of elevating the temperature of water to, under proper circumstances, the boiling point, if desired.

Another object is to provide a system including an efficient heat absorption unit for elevating the temperature of water using a solar energy alone.

Yet another object is to provide a system for elevating the temperature of water in a swimming pool.

Briefly described, the system of the present invention includes a body of liquid, the temperature of which is to be elevated, a liquid circulating pump, liquid conducting means for interconnecting the body of liquid and the pump in a closed loop recirculating system, and heat absorption means for receiving the solar radiation, converting it to heat, storing the heat and thereby elevating the temperature of the absorption means and the liquid. The heat absorption means includes a fluid conductor passing through the heat absorption means and coupled to the liquid conducting means to form a part of the recirculating system. The heat absorption means includes a particulate heat absorbing material which substantially surrounds the liquid conductor passing through the heat absorption means, the heat absorbing material having a major surface which is exposed to the solar radiation and which comprises, at least at the major surface, material consisting of black sand which is primarily compounds of iron oxide. The entire body of particulate material can consist of iron oxide, but at least a significant layer at the exposed surface must. The heat absorption means further includes a thermally nonconductive container to support and retain the liquid conductor passing therethrough and the particulate material, and is covered with radiation transparent sheet such as crystal glass which forms a wall of the container adjacent the major surface of the heat absorbing material.

In order that the manner in which the foregoing and other objects are obtained in accordance with the invention can be understood in detail, reference is made to the accompanying drawings, which form a part of this specification, and wherein.

Figure 1:
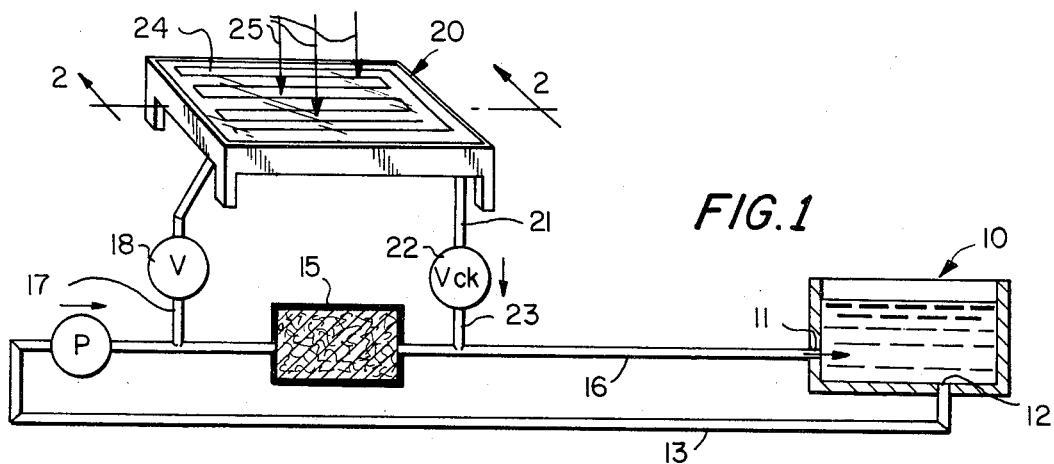
FIG. 1 is a schematic diagram of a typical system according to the invention.

Referring now to the drawings in detail, it will be seen that FIG. 1 shows a body of water indicated generally at 10 which can be a swimming pool having a water inlet 11 and an outlet 12, the outlet being connected to a pipe 13 which conducts water away from the pool under the influence of a pump 14 which normally feeds the water to a conventional filter 15 and returns the water to a conventional filter 15 and returns the water to inlet 11 through a pipe 16. This much of the system is conventional in nature, the pump and filter being employed to recirculate and continuously remove undesirable substances from the pool.

Coupled to this system is a heating apparatus including a pipe 27 which is coupled to the circulation system between the pump and filter and is provided with a valve 18 which can be manually or automatically operated but which, when opened, permits liquid to flow through pipe 17 to a heat absorption unit indicated generally at 20. The absorption unit, which will be described hereinafter in greater detail, includes internal piping which conducts the water entering on pipe 17 through the unit and out through pipe 21 which is provided with a check valve 22 which permits fluid flow only in the direction of arrow 23. Because of the greater resistance to fluid flow presented by filter 15, majority of the fluid will pass through heat absorption unit 20 when valve 18 is opened. Absorption unit 20 provided with a major surface 24 which is oriented in a direction to receive radiation from the Sun, the direction of solar radiation being indicated by arrows 25. The water passing through unit 20 is thus heated by this solar energy and it returned to the pool 10, elevating the temperature thereof.

Figure 2:
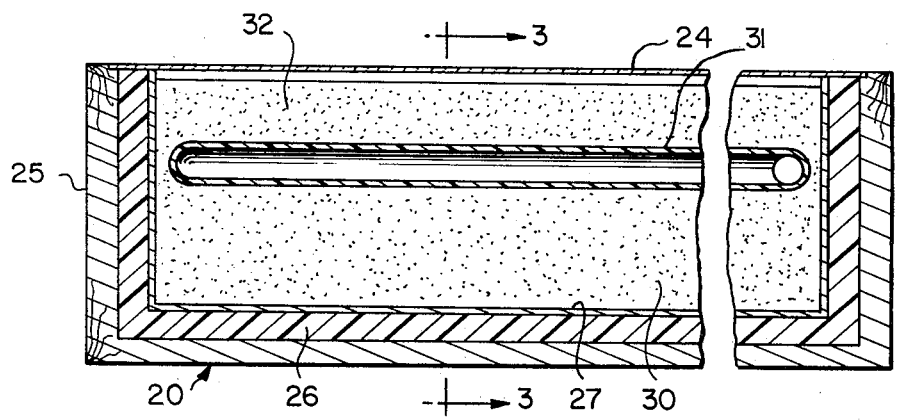
FIG. 2 is a sectional elevation of a heat absorptsion unit, the section being along lines 2—2 of FIG. 1.
Figure 3:
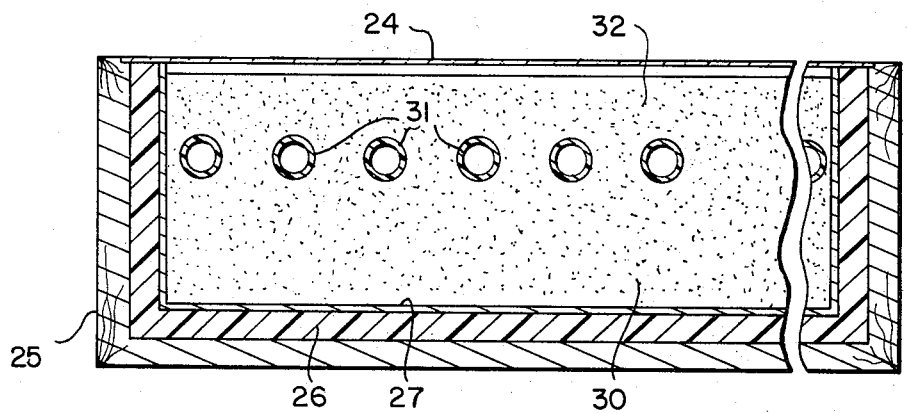
FIG. 3 is a section of the heat absorption unit along lines 3—3 of FIG. 2.

Heat absorption unit 20 is illustrated in greater detail in FIGS. 2 and 3 which are sectional views to more clearly illustrate the interior construction and materials. As previously mentioned, unit 20 has a major surface 24 disposed to receive radiation, this surface being defined by a pane of glass or other radiation transparent material. The remaining exterior portions of the absorption unit constitute a generally rectangular box 25, which box can be made of wood as shown or molded from fiberglass or other suitable relatively rigid, thermally nonconductive opaque and durable material. The box is five sided, the remaining side being transparent as previously described, and oriented toward the Sun.

The interior of box 25 is lined on the five opaque sides with a relatively thick layer 26 of a good plastic insulating material such as foamed polystyrene, which material is light and tends not to absorb moisture. Inside insulating layer 26 is a liner 27 of builder's foil which is a double layer of highly reflective metallic foil with a tar or similar layer sandwiched between the two foil layers. This liner prevents damage to or degradation of insulating layer 26 and tends to reflect heat back to the interior of the box.

Contained within the box thus far described is a body of particulate material 30, most of which can be conventional sand or the like. Resting on or buried in the thick layer of sand is a pipe assembly 31 which includes an array of pipe arranged and disposed to carry the water which flows through the heat absorption unit the water which flows through the heat absorption unit between pipes 17 and 21, so that the water can absorb heat while passing therethrough. Pipe 31 can be a continuous length of pipe arranged in a serpentine fashion or it can constitute a plurality of parallel pieces of pipe connected at their ends to header members, as will be further described. The pipe can be constructed of copper, but it has been found that the pipe need not be highly thermally conductive material and, in fact, can be plastic pipe, such as commonly used ABS or acrylonitrile butadiene styrene pipe which is less expensive and relatively simple to work. A typical structure includes 25 lengths, or 12½ loops, of ¾ inch ABS pipe, spaced on 3½ inch centers, in a box which is approximately 4 feet by 8 feet in outer dimensions and approximately 6 inches deep. The pipe is covered by about 2 inches of particulate material. The glass pane 24 is 7/16 inch flat crystal glass.

Of particular consequence in the assembly of this structure is the incorporation of a substantial layer 32 of "black sand" or magnetite. For reasons for which are not completely understood, the incorporation of a ferric compound and, specifically, this iron oxide compound as the upper layer of the material beneath the glass in the box vastly improves the heat absorption characteristics thereof and permits maximum utilization of that solar energy which falls upon pane 24. In fact, material 30 and 32 can all be iron oxide with no added sand, but it is particularly significant that the top one fourth inch of the portion between pipe 31 and window 24 be iron oxide for best effect.

The iron oxide compound which has been utilized primarily and found to be effective is that colloquially referred to as "black sand" and constitutes part of the tailings remaining after a gold placer mining, or gold panning, operation. The material is not truly sand in the sense of being silica compound but, instead, is an iron oxide which is largely magnetite ($Fe_3O_4$) with titanium compounds such as ilmenite ($F_e T_i O_s$) or rutile ($T_i O_2$) and other iron compounds, and is a naturally occurring material in for example, the geologic formations in which gold is found. The residue from the placer mining operations has been employed, and has been found to give excellent results, in a structure as above-described.

Further discussions of the black sand, as this term is used herein, can be found in Bureau of Mines Information Circulars 8517 and 7000.

Figure 4:
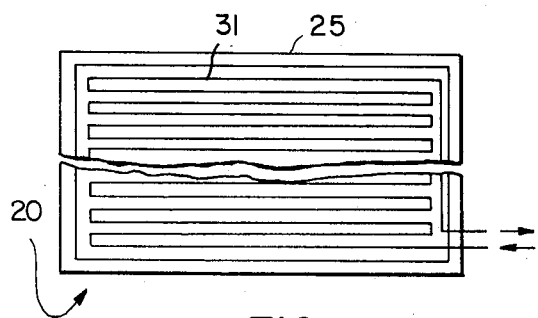
FIG. 4 is a foreshortened plan view of a heat absorption unit showing, schematically, a typical serpentine type array.
Figure 5:
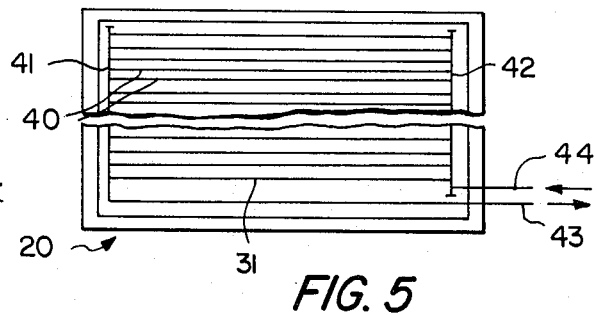
FIG. 5 is a foreshortened plan view of a heat absorption unit having a header type array.

As previously mentioned, the pipe in the box can be arranged in either of at least two ways, these being schematically illustrated in FIGS. 4 and 5. In FIG. 4, the pipe is arranged in a serpentine fashion with the pipe being continuously wound back and forth in the box alternatively, it is possible to employ the header approach wherein a plurality of parallel lengths of plastic pipe 40 are connected at one end to a header 41 which is provided with a plurality of equally spaced holes of appropriate diameter. The pipes are connected to each other with a conventional adhesive, commonly used in the assembly of ABS pipe. A second header 42 is connected to pipes 40 at their opposite ends. Inlet and outlet pipes 43 and 44 are connected to headers 41 and 42, respectively. The assembly can then be placed in the preassembled structure and covered with the iron oxide material.

While certain advantageous embodiments have been chosen to illustrate the invention it will be understood by those skilled in the art that various changes and modifications can be made therein without departing from the scope of the invention as defined in the appended claims.

I claim:
1. A solar heating system comprising
   a body of liquid to be heated,
   a liquid circulating pump;
   liquid conducting means for interconnecting said body of liquid and said pump in a closed loop recirculating system; and
   heat absorption means for receiving solar radiation and for converting to and storing heat from said radiation and for transferring the heat to the liquid, said heat absorption means comprising
   pipe means coupled to said liquid conducting means to form a part of said recirculating system;

a particulate heat absorbing material substantially surrounding said pipe means and having a major surface exposed to the solar radiation, at least the major surface of the material consisting of iron oxide;
   a thermally nonconductive container to support and retain said pipe means and said material; and a radiation transparent sheet forming one wall of said container adjacent said major surface of said heat absorbing material.

2. A system according to claim 1 wherein said pipe means includes
   a plurality of substantially parallel pipe sections and first and second transverse header pipes, each of said header pipes being connected to one end of each of said pipe sections; and
   first and second coupler pipes for connecting said first and second headers, respectively, to said liquid conducting means.

3. A system according to claim 1 wherein said pipe means comprises
   a pipe formed in a serpentine array lying substantially in a single plane.

4. A system according to claim 1 wherein a majority of said particulate material is magnetite.

* * * * *